Figure 1:
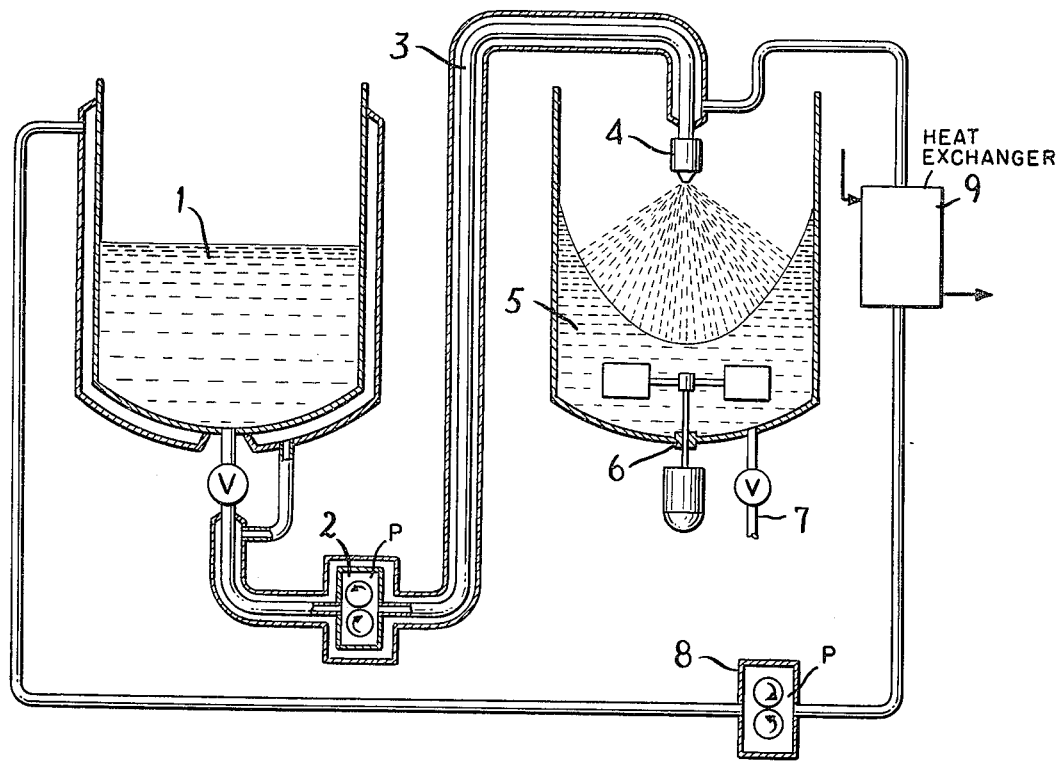
Figure 2:
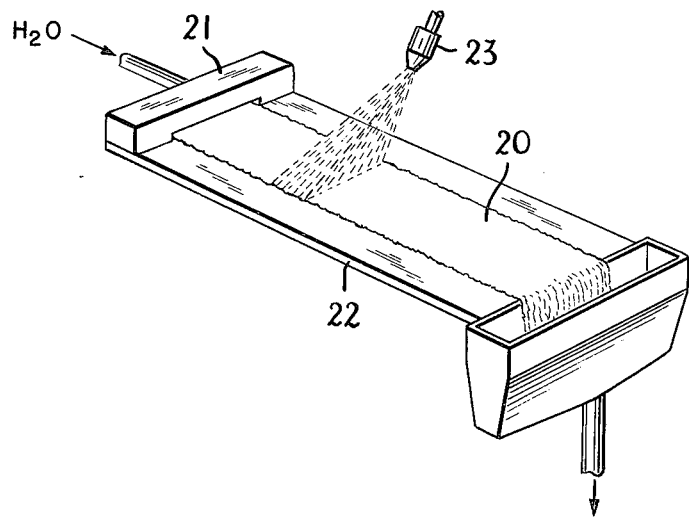
Figure 3:
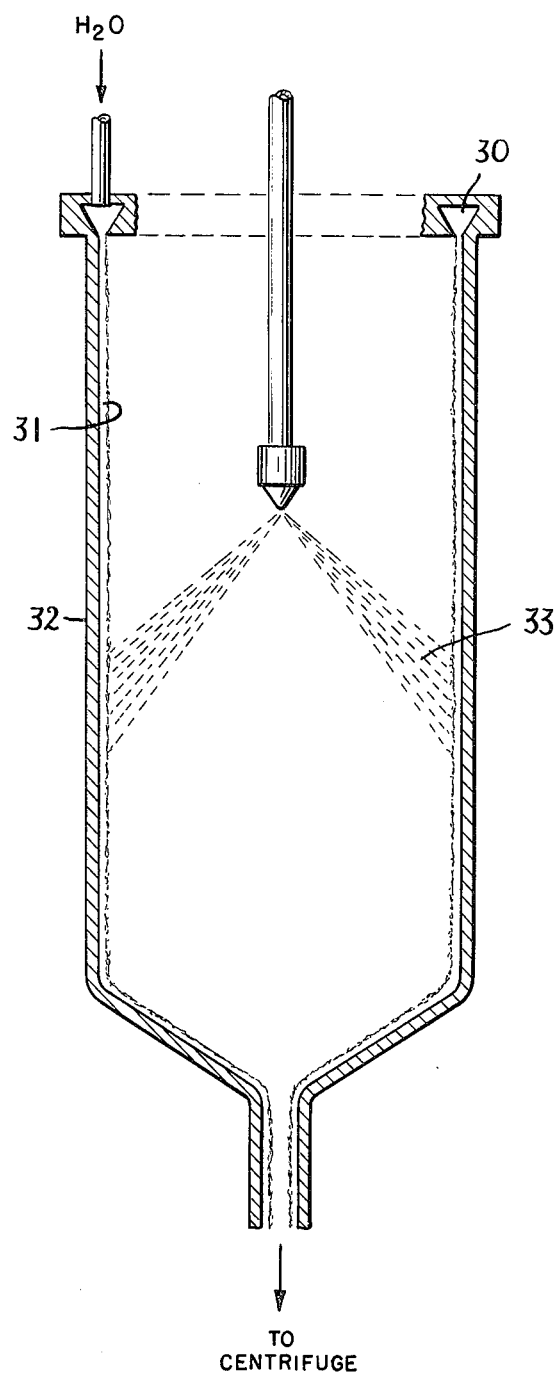

United States Patent [19]

Gabler et al.

[11] 3,953,401

[45] Apr. 27, 1976

[54] PROCESS FOR SEPARATING AROMATIC POLYMERS FROM SOLUTION

[75] Inventors: Rudolf Gabler, Vitikon; Josef Studinka, Zurich, both of Switzerland

[73] Assignee: Inventa AG fur Forschung und Patentverwertung, Zurich, Switzerland

[22] Filed: Jan. 22, 1974

[21] Appl. No.: 435,555

[30] Foreign Application Priority Data

Jan. 26, 1973 Switzerland.......................... 1114/73

[52] U.S. Cl................................... 260/49; 260/2 R; 260/2 H; 260/47 R; 260/47 ET; 260/63 R; 260/78 R; 260/78 A; 260/78 S; 260/79; 260/79.3 M

[51] Int. Cl.² ................. C08G 65/40; C08G 69/46; C08G 75/24

[58] Field of Search.................. 260/47 R, 49, 78 R, 260/78 A, 78 S, 47 ET, 79 R, 79.3 M, 63 R, 2 R, 2 H

[56] References Cited

UNITED STATES PATENTS

| 3,639,659 | 2/1972 | Nieswandt et al. ................... | 260/78 |
|-----------|--------|---------------------------------|--------|
| 3,839,285 | 10/1974 | Kunzel et al........................... | 260/47 |
| B262,599 | 1/1975 | Turnbull.............................. | 260/78 |

*Primary Examiner*—Lester L. Lee
*Attorney, Agent, or Firm*—Jordan B. Bierman; Linda Bierman; Kenneth J. Stempler

[57] ABSTRACT

A process for separating aromatic polymers from solutions containing them which comprises spraying the polymer solution, under pressure, onto the surface of a moving precipitation medium of the general formula ROH in which R is hydrogen or a lower alkyl group.

8 Claims, 3 Drawing Figures

PROCESS FOR SEPARATING AROMATIC POLYMERS FROM SOLUTION

The present invention is related to a process for separating aromatic polymers from a solution which contains them, and apparatus suitable for this purpose.

High molecular weight aromatic polymers with the repeating structural formula I:

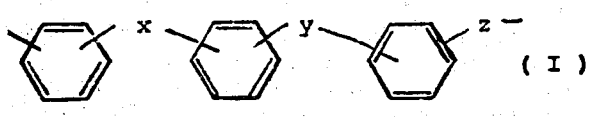

in which x, y and z, being the same or different, represent the radicals —O—, —S—, —SO$_2$—, —CO—, —CONH—, —N=N—, —(CH$_2$)—$_n$ (n = 1 or 2) or —C(CH$_3$)$_2$— or direct bonds between the rings, have achieved considerable importance in technology because of their outstanding long range temperature stability. The technique for their manufacture almost invariably involves the polycondensation of appropriate bifunctional raw materials in polar aprotic solvents in which the polymers to be formed are soluble. In some cases, salts such as lithium chloride or calcium chloride must frequently be added in order to hold the polymers formed by the reaction in solution. This is true, for example, with aromatic polyamides.

Before the products undergo their final shaping into technologically useful forms, such as injection-molded items, foils, coatings, fibers and continuous moldings, the polar aprotic solvent and, where necessary, the replaced salts must be completely removed from the polymer in order to avoid serious impairment of the useful properties of the finished product. This is especially true if the article is to be used in an environment where high temperatures prevail.

Studies such as those described in U.S. Pat. No. 3,360,598 have shown that a salt content of 0.1% or more present in aromatic polyamides can have an injurious effect on the mechanical properties of fibers manufactured from these materials. The same applies to the retention of a solvent residue in molded objects. In this case, when the content of residual solvent exceeds 0.5%, premature discoloration and embrittlement of the molded article result at temperatures in excess of 150° to 180°C.

The removal of residual traces of the solvent of salt from aromatic polymers is complicated by the fact that polymers corresponding to formula I have a decided affinity for polar aprotic solvents and salts of the alkali halide or alkaline earth halide class of salts. Accordingly, their removal is extremely difficult. This is why conventional methods of extracting or drying aromatic polymers corresponding to formula I over granular or coarsely powdered materials is either completely ineffective or is possible only after numerous washing operations.

It was with these difficulties in mind that German Patent 2,200,502 made the proposal of using a high melting point auxiliary solvent to separate the aromatic polymers. After the auxiliary solvent is added, the reaction solvent is distilled away in a vacuum leaving a solution of polymers in the auxiliary solvent. This solution is frozen by pouring it over plates, then crushed, pulverized and extracted with a third organic solvent which has a low boiling point. By this method one obtains the aromatic polymer in powdered form, which is then subjected to an additional extraction with water. But forgetting for the moment that there is no analytical proof of a complete absence of the auxiliary solvent in the polymer when this method is used, clearly this process is complicated and time-consuming, as well as economically unattractive.

It has now been found that aromatic polymers corresponding to general formula I, with the radicals x, y, and z defined as above, can be separated directly from the polycondensation solution in a polar aprotic solvent, in the form of a fine, uniformly divided powder that is eminently suited for the removal of residual solvents and/or salts by extraction with water or aliphatic alcohols.

Accordingly, the present invention is a process for separating high molecular weight aromatic polymers into fine, uniformly divided powders. These polymers have the repeating generic structure (I)

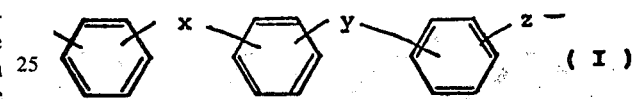

in which y, y and z each being the same or different, represent the radicals —O—, —S—, —SO$_2$—, —CO—, —CONH—, —N=N—, —(CH$_2$)—n (n = 1 or 2) or —C(CH$_3$)$_2$—, or direct bonds between the benzene rings. The substituents x, y and z are attached either meta- or para- to any particular ring. A solution of these polymers in an aprotic solvent (or mixture of solvents), possible in the presence of a diluting agent, is sprayed under pressure onto the surface of a moving precipitation medium with the general formula ROH, in which R represents hydrogen or a lower alkyl radical having 1 to 4 carbon atoms. Included in suitable precipitating media are water, methanol, ethanol, and all the isomers of propanol and butanol. Although it is preferable to use water as the precipitation agent, the above C$_1$ to C$_4$ alcohols may also be used effectively. Of the latter, methanol or ethanol are preferable.

If a dilution agent is used, then dimethylformamide is recommended, particularly if the precipitation medium used is water. Especially faborable results are obtained by using the following high-molecular aromatic polymers in the polar aprotic solvents indicated:

A polymer with the recurring structural elements

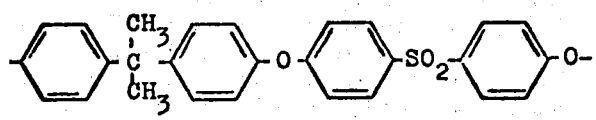

dissolved in dimethylsulfoxide (Swiss Patent 447,604), a polymer with the recurring structural element

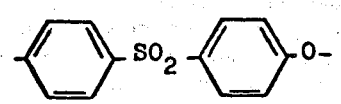

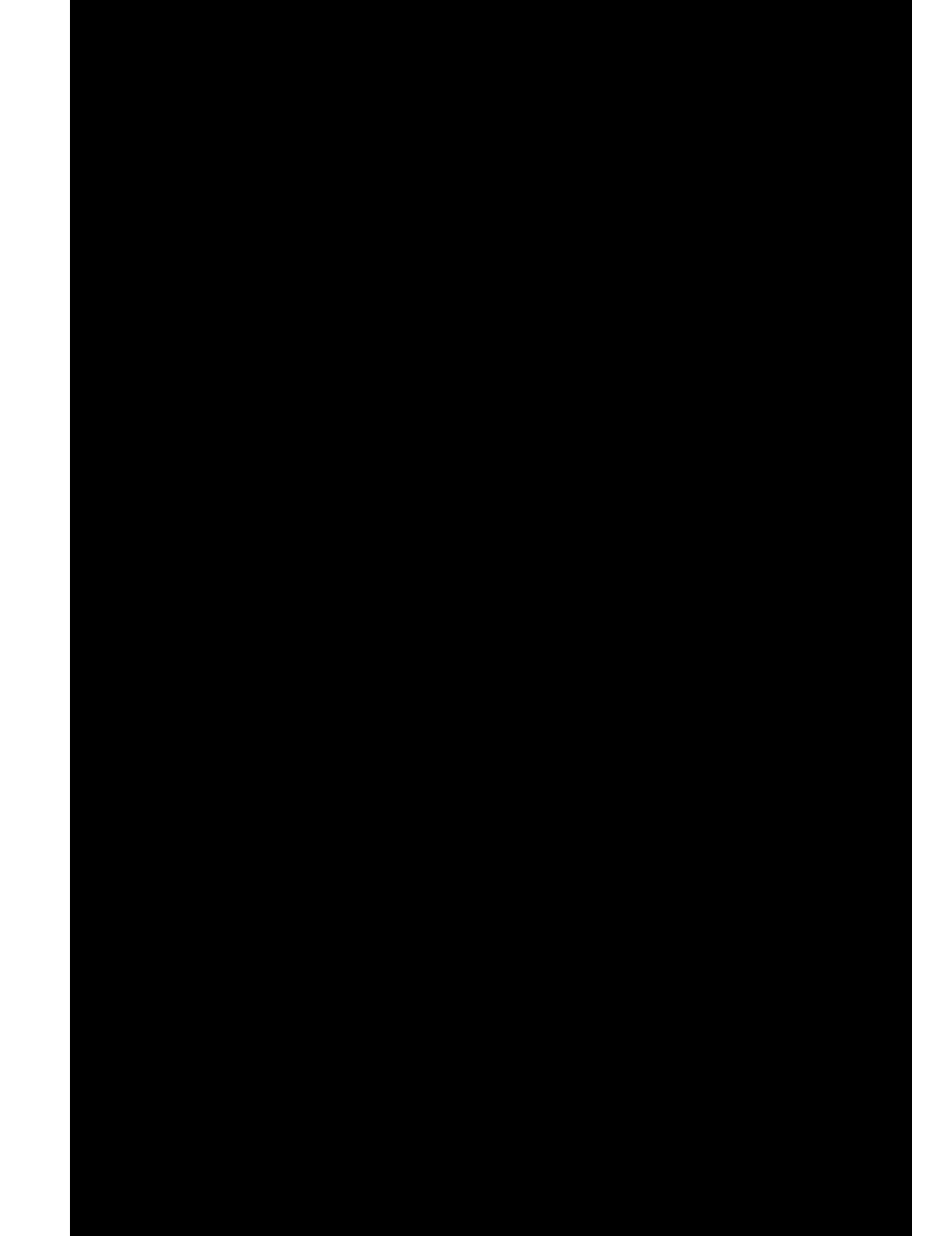

EXAMPLE 1

A solution in dimethylsulfoxide of polymers with recurring elements having the molecular structure

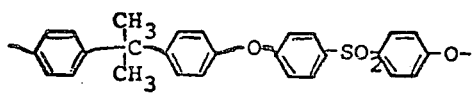

was prepared in accordance with example 1 of Swiss Patent 447,603, but in a batch 100 times as large. The solution was diluted with 4.5 liters of dimethylformamide, and the suspended potassium chloride filtered out.

Referring to FIG. I, the solution was placed in a 25 liter stainless steel container 1 and heated to 110°. The viscosity of the solution at this temperature was 8.5 poises. A high pressure piston pump 2 with supplementary heating conveyed the solution at a pressure of 120 atmospheres through a pipeline 3, also heated to 110°, to a "perfect cone" spray nozzle 4, (Lechler Model SZ 006/45) from which the solution was sprayed.

The nozzle was centered in the upper section of 100 liter stainless steel tank 5 filled with 30 liters of water and was stirred in such a manner, with an agitator built into the bottom of the tank, that a laminar flow of water in the form of a parabolic "funnel" was produced. At a distance varying from 40 to 50 centimeters, the fine stream of polymer solution made contact with the rotating water surface, at which point the solid polymer precipitated in the form of a powder with an average grain size of 80 $\mu$. The powder was separated from the water-solvent mixture by centrifugation, washed three times with hot water, and dried. After washing and drying, the powder contained 0.1% organic solvent and could be directly processed into high-quality foil in a double-worm extruders.

EXAMPLE 2

A solution in sulfolane (tetrahydrothiophene 1,1-dioxide) of polymers with the recurring structural elements

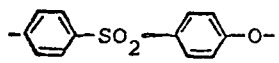

was produced in accordance with Example 12 of British Patent 1,153,035, but in a batch 500 times as large. This solution, diluted with 6 liters dimethylformamide and filtered, was placed in a 25 liter stainless steel container and heated to 85°. The viscosity of the solution at this temperature was 11 poises. A high pressure diaphragm pump, also heated to 85°, conveyed the solution under a pressure of 154 atmospheres gauge to a swiveled flow nipple, Schlick Model 655/I, with a spraying angle of 15°.

Referring to FIG. II the separation of the polymer in the form of a fine powder was achieved with the fan-shaped stream of atomized polymer solution making contact with a moving sheet of water at a distance of 40 cm, the latter being emitted by a slotted nozzle, dimensions 160 × 0.3 mm, and flowing over a 45° inclined plane. The powder dispersion traveled via a funnel to the centrifuge, where the powdered polymer was separated from the water-solvent mixture. This process was performed in a continuous cycle until the concentration of solvent was approximately 20 – 30 percent by weight. From this point onward, the concentration of solvent was held constant by the addition of fresh water, and a corresponding amount of liquid was removed from the cycle.

The powder obtained from the centrifuge had an average grain size of 120 $\mu$ and purified of salts and solvents by a three-fold water extraction.

EXAMPLE 3

A solution in dimethylacetamide of polyamides with recurring structural elements

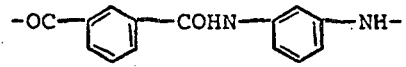

containing 10 wt. % polyamide and 2% by weight of calcium chloride based on the amount of solvent, was prepared in accordance with Example 14 of U.S. Pat. No. 3,063,966.

10 liters of the solution was placed in a 25 liter container and heated to 70°. The viscosity of the solution at this temperature was 18.6 poises. Using a preheated high pressure piston pump, the solution was delivered under a pressure of 220 atmospheres gauge to a Lechler "perfect cone" nozzle, type KS 1/13, with a spraying angle of 60°.

Referring to FIG. III, the polyamide powder precipitated in a cylindrical container 50 cm in diameter and 100 cm long, over whose inner wall a film of methanol flowed downward along the entire circumference. The methanol film was prepared by means of a "circular slot" nozzle, slot width 0.3 mm, attached to the cover of the container. The methanol was added at the rate of 8 liters per minute, while the polymer solution was sprayed at the rate of 2 liters per minute.

A suspension of the polyamide powder was transferred to a continuously operating pusher centrifuge, where the powder was separated from the methanol dimethylacetamide mixture. After a threefold methanol extraction, the powder yielded the following data upon analysis:

| | |
|---|---|
| Average grain size | 82 $\mu$ |
| Dimethylacetamide content | (by gas chromatography) 0.06% |
| Calcium chloride content | (Chlorine determination) 0.02% |

EXAMPLE 4

A solution in tetramethylurea of polymers with recurring structural elements

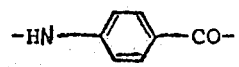

containing 10.8% polyamide and 6% lithium chloride by weight based on the weight of 6% was prepared in accordance with example 58 of U.S. Pat. No. 3,671,542 but in a batch 10 times as large.

20 liters of this solution was sprayed and pulverized in accordance with Example 1, in the type of apparatus shown in FIG. 1. The following operational data was obtained from the use of this product:

| | |
|---|---|
| Temperature of polymer solution | 120°C |
| Viscosity at 120° | 21.2 poises |
| Spray pressure | 240 atmospheres gauge |

-continued

| | |
|---|---|
| Nozzle | Spray systems 2/30 |
| Type of stream | Perfect cone |
| Rate of delivery | 3.5 liters per minute |

Data from analysis of the powder (after washing and drying):

| | |
|---|---|
| Average grain size | 105 μ |
| Bulk weight | 0.20 |
| Tetramethylurea content | 0.52 |
| Lithium chloride content | 0.23 |

EXAMPLE 5

A solution in dimethylformamide of polymers with recurring structural elements

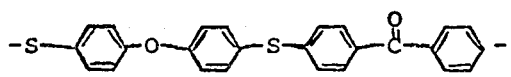

was prepared in accordance with Example 1 of British Patent 1,124,200.

The polymer was isolated in powder from in accordance with Example 3, using the type of apparatus shown in FIG. III.

The following operational data was obtained upon application:

| | |
|---|---|
| Temperature of polymer solution | 85°C |
| Viscosity of solution at 85°C | 17.5 poises |
| Spray pressure | 200 atmospheres gauge |
| Nozzle | Lechler KS 1/13 |
| Type of stream | Perfect cone |
| Spray angle | 60° |
| Rate of delivery | 3.9 liters per minute |

Data obtained from analysis of the powder after washing and drying:

| | |
|---|---|
| Average grain size | 70–80 μ |
| Bulk weight | 0.18 |
| Dimethylformamide content | 0.18% |

EXAMPLE 6

Using monothiohydroquinone and 4,4'-dichlorodiphenylsulfone, a solution in dimethylsulfoxide of an aromatic polyether-thioether lacking any uniform structural elements was prepared in accordance with Example 1 of German Patent 2,117,820.

The filtered solution, thinned out with dimethylsulfoxide to a polymer content of 18%, was sprayed according to the method of Example 3, in an apparatus of the type shown in FIG. III, to obtain a powder, from which the following operational data was obtained:

| | |
|---|---|
| Temperature of polymer solution | 60°C |
| Viscosity of solution at 60°C | 6.3 poises |
| Spray pressure | 70 atmospheres gauge |
| Nozzle type | Schlick 103/3 |
| Type of stream | Hollow cone |
| Spray angle | 45° |
| Rate of Delivery | 4.5 liters per minute |

Data obtained from analysis of the powder after washing and drying:

| | |
|---|---|
| Average grain size | 140 μ |
| Bulk weight | 0.16 |
| Dimethylsulfoxide content | 0.12% |
| Sodium chloride content | 0.02% |

What is claimed is:
1. A process for isolating a high molecular weight aromatic polymer in the form of a fine, uniform powder, said polymer being easily freed of residual salts and solvent, which comprises
   a. dissolving in an aprotic solvent a polymer having the repeating structure (I):

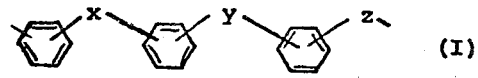

in which the linking bonds on any particular benzene ring are positioned meta or para to each other, in which x, y and z, each being the same or different, consist of the radicals —O—, —S—, —SO$_2$— —CO—, —CONH—, —N=N—, —C(CH$_3$)$_2$—, —(CH$_2$)$_n$— where n is 1 or 2, or a direct bond between the benzene rings; and
   b. spraying the polymer solution onto the surface of a moving precipitation medium having the formula ROH in which R is a hydrogen or an alkyl group having 1 to 4 carbon atoms, thereby precipitating said polymer in a fine, uniform powder.

2. The process of claim 1 in which the aprotic solvent is dimethylsulfoxide, dimethylformamide, sulfolane, dimethylacetamide, or tetramethylurea.

3. The process of claim 1 in which the aromatic polymer has the repeating structure

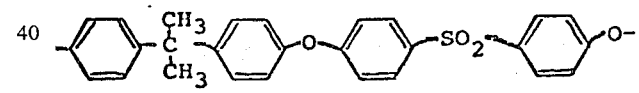

4. The process of claim 1 in which the aromatic polymer has the repeating structure

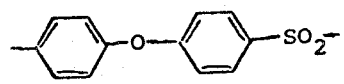

5. The process of claim 1 in which the aromatic polymer has the repeating structure

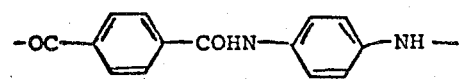

6. The process of claim 1 in which the aromatic polymer has the repeating structure

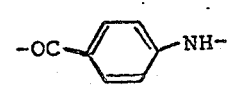

7. The process of claim 1 in which the aromatic polymer has the repeating structure
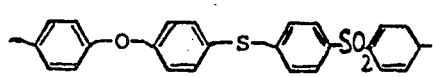
8. The process of claim 1 in which the aromatic polymer is a copolymer with irregular structural elements, said copolymer being prepared from 4-mercaptophenol and 4,4'-dichlorodiphenyl sulfone.
* * * * *